US012722973B2

(12) United States Patent
Park et al.

(10) Patent No.: US 12,722,973 B2
(45) Date of Patent: Sep. 1, 2026

(54) METHOD OF RECYCLING HELIUM FROM WASTE GAS IN SEMICONDUCTOR PROCESS

(71) Applicant: SAMSUNG ELECTRONICS CO., LTD., Suwon-si (KR)

(72) Inventors: Myungbeom Park, Suwon-si (KR); Sungbae Kim, Suwon-si (KR); Jongsoo Kim, Suwon-si (KR); Samjong Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 289 days.

(21) Appl. No.: 18/677,245

(22) Filed: May 29, 2024

(65) Prior Publication Data

US 2025/0122079 A1 Apr. 17, 2025

(30) Foreign Application Priority Data

Jun. 1, 2023 (KR) ........................ 10-2023-0071190
Oct. 13, 2023 (KR) ........................ 10-2023-0137029

(51) Int. Cl.
*C01B 23/00* (2006.01)
*B01D 47/06* (2006.01)

(52) U.S. Cl.
CPC .......... *C01B 23/0068* (2013.01); *B01D 47/06* (2013.01); *C01B 2210/0012* (2013.01); *C01B 2210/0018* (2013.01); *C01B 2210/002* (2013.01); *C01B 2210/0031* (2013.01); *C01B 2210/0051* (2013.01); *C01B 2210/0062* (2013.01)

(58) Field of Classification Search
CPC ...................................................... B01D 47/06
See application file for complete search history.

(56) References Cited

U.S. PATENT DOCUMENTS 5,890,376 A * 4/1999 Chludzinski ...... C03B 37/01413 62/619
6,442,948 B1 9/2002 Takeda
7,294,172 B2 11/2007 Baksh et al.
7,604,750 B2 10/2009 Shin et al.
8,591,634 B2 11/2013 Winchester et al.
8,973,397 B2 3/2015 Rillo Millán et al.
9,649,590 B2 5/2017 Albright et al.
(Continued)

FOREIGN PATENT DOCUMENTS

CN 215742833 U * 2/2022
JP 3299069 B2 7/2002
(Continued)

*Primary Examiner* — Robert A Hopkins
(74) *Attorney, Agent, or Firm* — Sughrue Mion, PLLC

(57) ABSTRACT

A method of recycling helium from a waste gas generated in a semiconductor process includes forming a first treatment gas by treating helium-containing waste gas emitted from a semiconductor process facility by using a scrubber module, transporting the first treatment gas to a purification facility, forming a first helium gas with a first purity by fractionating the first treatment gas in the purification facility, forming a second helium gas with a second purity by treating the first helium gas by using a back-end purification module in the purification facility, and providing the second helium gas to the semiconductor process facility.

20 Claims, 8 Drawing Sheets

(56) References Cited

U.S. PATENT DOCUMENTS

| | | | |
|---|---|---|---|
| 10,207,928 | B2 | 2/2019 | Voss et al. |
| 10,408,536 | B2 | 9/2019 | Shelat et al. |
| 2009/0185969 | A1 | 7/2009 | Lose et al. |
| 2011/0174017 | A1 | 7/2011 | Victory et al. |
| 2020/0411310 | A1 | 12/2020 | Kao et al. |
| 2023/0356165 | A1 | 11/2023 | Okada et al. |

FOREIGN PATENT DOCUMENTS

| | | | |
|---|---|---|---|
| KR | 10-0902911 | B1 | 6/2009 |
| KR | 10-0949525 | B1 | 3/2010 |
| KR | 10-2023-0053682 | A | 4/2023 |
| WO | 03/011431 | A1 | 2/2003 |

* cited by examiner

FIG. 5

METHOD OF RECYCLING HELIUM FROM WASTE GAS IN SEMICONDUCTOR PROCESS

CROSS-REFERENCE TO RELATED APPLICATIONS

This application is based on and claims priority to Korean Patent Application Nos. 10-2023-0071190, filed on Jun. 1, 2023, and 10-2023-0137029, filed on Oct. 13, 2023, in the Korean Intellectual Property Office, the disclosures of which are incorporated by reference herein in their entireties.

BACKGROUND

The present disclosure relates to a system and method of recycling helium from waste gas generated in a semiconductor process.

Helium is one of the inert gases and is used in various semiconductor processes. Helium is a rare gas that is generally classified as a by-product during natural gas production, and it is necessary to be imported through long-distance logistics from natural gas producing countries. Thus, considering factors such as fluctuations in raw material prices due to the international situation and differences in the raw material quality between various producing countries is required. In addition, due to the carbon neutral policy, there has been a trend to avoid long-distance logistics to reduce carbon emissions. A cost-saving, stable helium supply plan without the influence of external factors has been discussed.

SUMMARY

The present disclosure relates to a method of recycling helium from waste gas generated in a semiconductor process, whereby costs are reduced and high purity helium may be recovered.

The present disclosure relates to a system for recycling helium from waste gas generated in a semiconductor process, in which costs are reduced and high purity helium may be recovered.

The present disclosure provides a method of recycling helium from waste gas generated in a semiconductor process. According to an aspect of the present disclosure, there is provided a method of recycling helium from a waste gas generated in a semiconductor process, the method including forming a first treatment gas by treating helium-containing waste gas emitted from a semiconductor process facility by using a scrubber module, transporting the first treatment gas to a purification facility, forming a first helium gas with a first purity by fractionating the first treatment gas in the purification facility, forming a second helium gas with a second purity by treating the first helium gas by using a back-end purification module in the purification facility, and providing the second helium gas to the semiconductor process facility.

The present disclosure provides a method of recycling helium from waste gas generated in a semiconductor process. According to an aspect of the present disclosure, there is provided a method of recycling helium from a waste gas generated in a semiconductor process, the method including using helium gas transported from a semiconductor raw material storage facility in a first process line and a second process line, forming a first helium-containing waste gas in the first process line and forming a second helium-containing waste gas in the second process line, forming a first treatment gas by processing the first helium-containing waste gas by using a scrubber module, and compressing the first treatment gas and the second helium-containing waste gas and transporting the first treatment gas and the second helium-containing waste gas to a purification facility, forming a second treatment gas by mixing the first treatment gas and the second helium-containing waste gas in the purification facility, and forming a first helium gas with a first purity by fractionating the second treatment gas, forming a second helium gas with a second purity by treating the first helium gas by using a back-end purification module in the purification facility, and compressing the second helium gas and providing the compressed second helium gas to the semiconductor raw material storage facility.

The present disclosure provides a method of recycling helium from waste gas generated in a semiconductor process. According to an aspect of the present disclosure, there is provided a method of recycling helium from a waste gas generated in a semiconductor process, the method including forming contaminant powder by burning a helium-containing waste gas emitted from a semiconductor process facility by using a scrubber module, and forming a first treatment gas by removing the contaminant powder by using a cleaning solution, filtering out impurity particles having a diameter of 3 nm or more contained in the first treatment gas, compressing the first treatment gas and then transporting the compressed first treatment gas to a purification facility, removing at least some of impurities from the first treatment gas by performing pressure swing adsorption on the first treatment gas transported under high pressure in the purification facility, after a first treatment liquid is formed by liquefying the first treatment gas in the purification facility, obtaining a first helium gas with a first purity separated into vapor by increasing a temperature of the first treatment gas by using a difference in boiling point, forming a second helium gas with a second purity by treating the first helium gas by using a back-end purification module in the purification facility, and compressing the second helium gas and providing the compressed second helium gas to the semiconductor process facility.

BRIEF DESCRIPTION OF DRAWINGS

Embodiments of the present disclosure will be more clearly understood from the following detailed description taken in conjunction with the accompanying drawings in which:

FIG. 5 is a block diagram of a system for reusing helium from waste gas generated in a semiconductor process, according to some embodiments.

DETAILED DESCRIPTION

Figure 1:
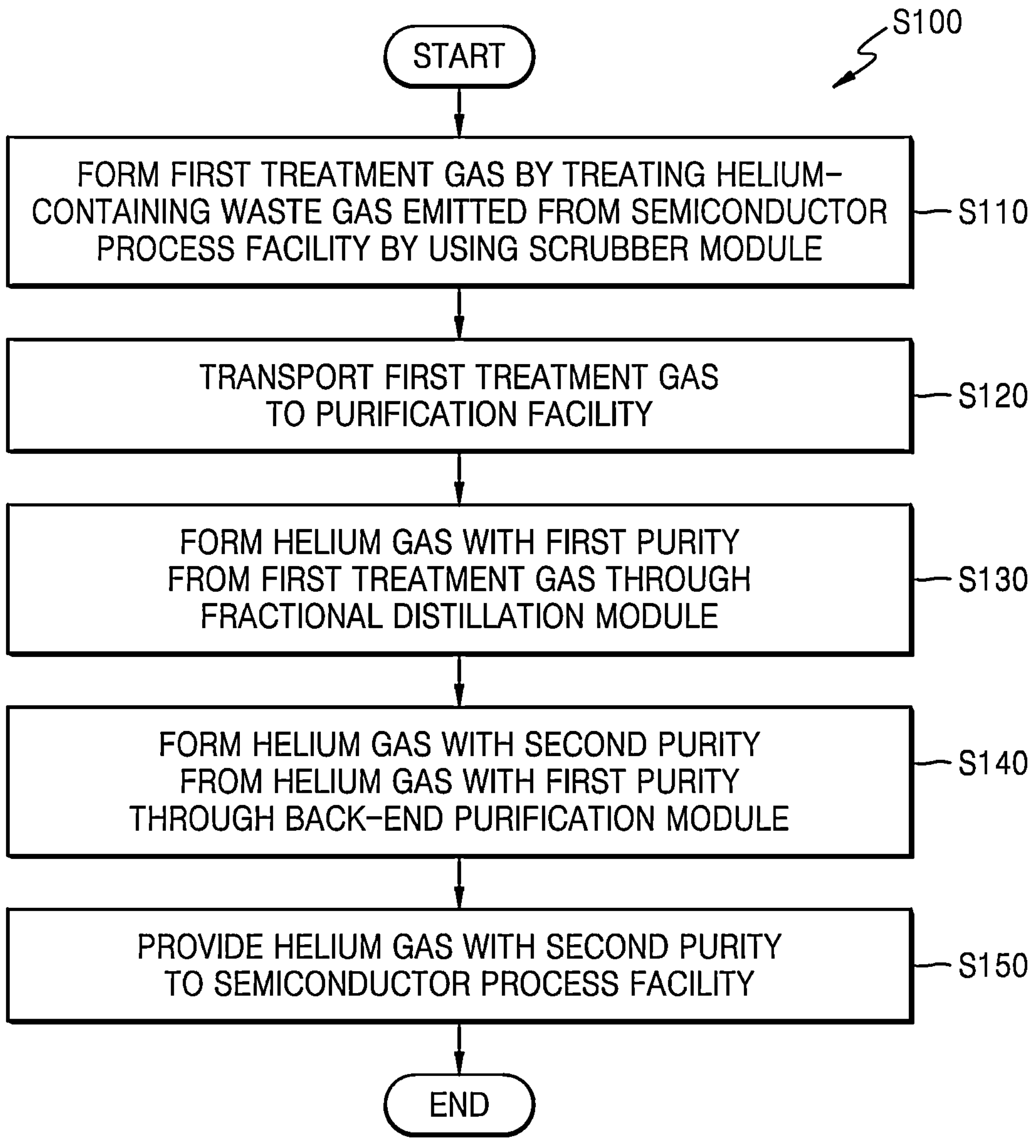
FIG. 1 is a flowchart of a method of reusing helium from waste gas generated in a semiconductor process, according to embodiments.

Hereinafter, embodiments are described in detail with reference to the accompanying drawings. In the drawings, the same reference characters are used for the same elements, and redundant descriptions thereof are omitted.

FIG. 1 is a flowchart of a method S100 of reusing helium from waste gas generated in a semiconductor process, according to embodiments.

Referring to FIG. 1, the method S100 of reusing helium from waste gas generated in a semiconductor process includes a first operation S110 of forming a first treatment gas by treating helium-containing waste gas emitted from a semiconductor process facility with a scrubber module, a second operation S120 of compressing the first treatment gas and transporting the compressed gas to a purification facility, a third operation S130 of forming a helium gas with a first purity from the first treatment gas through a fractional distillation module, a fourth operation S140 of forming a helium gas with a second purity from the helium with the first purity through a back-end purification module, and a fifth operation S150 of compressing the helium gas with the second purity and providing the compressed helium gas to a semiconductor process facility.

When an embodiment may be implemented differently, a specific process order may be performed differently from the described order. For example, two processes described in succession may be performed substantially at the same time, or may be performed in an order opposite to the described order.

The technical feature of each of the first to fifth operations S110 to S150 is described in detail below with reference to FIGS. 2A to 2D together.

Figure 2A:
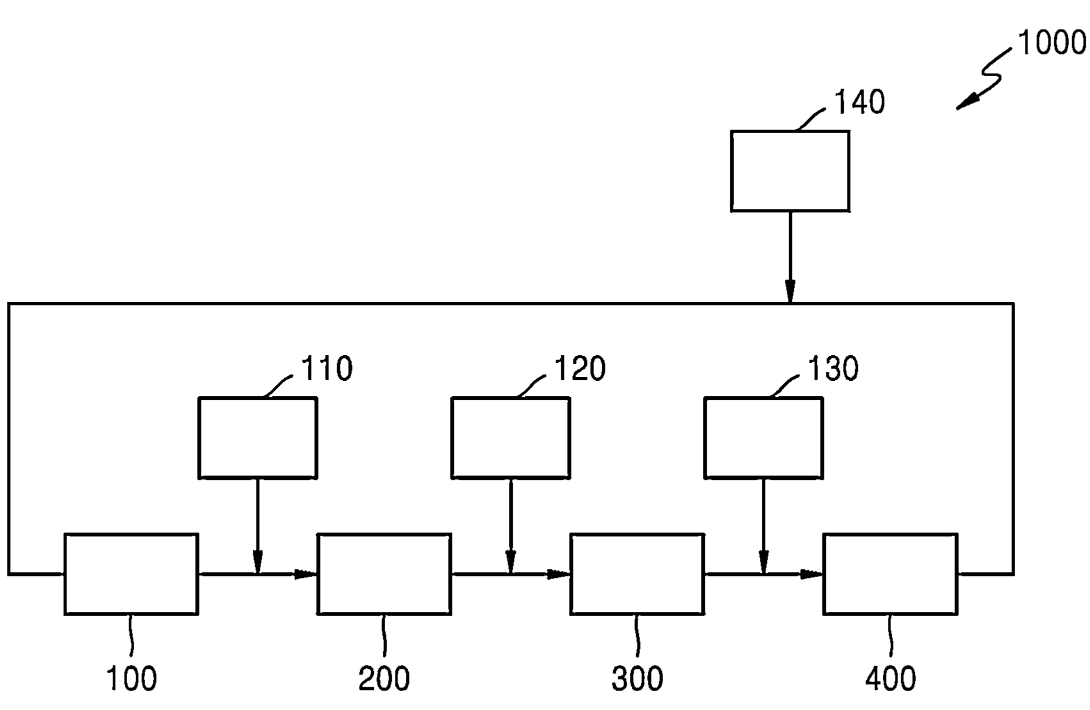
FIG. 2A is a block diagram of a system for reusing helium from waste gas generated in a semiconductor process, according to embodiments.
Figure 2B:
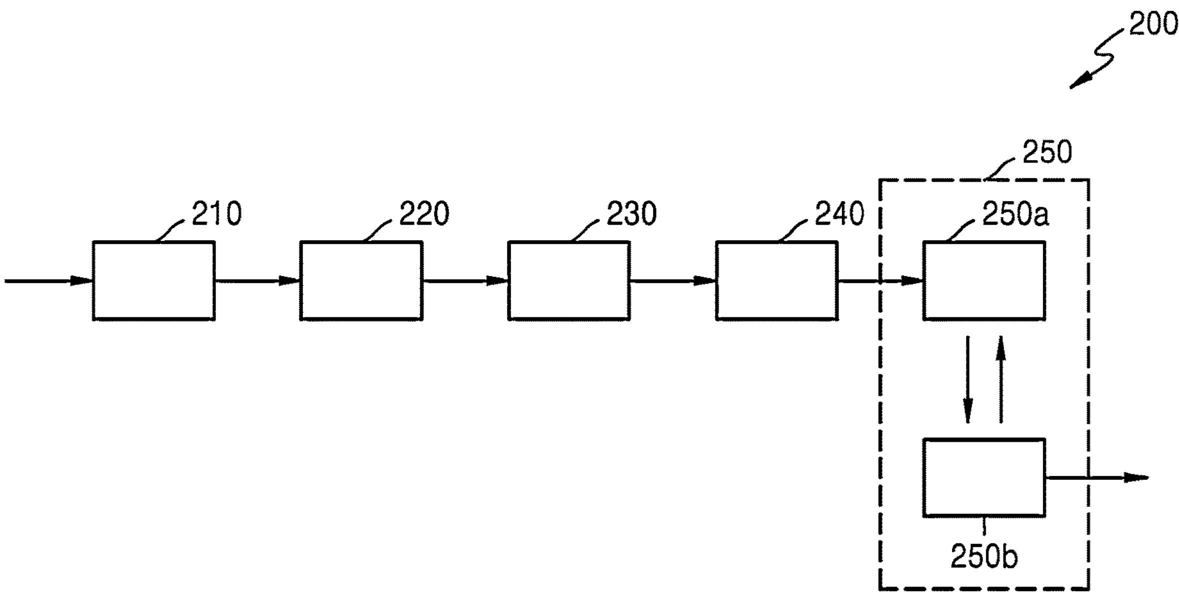
FIG. 2B is a block diagram of a scrubber module according to embodiments.
Figure 2C:
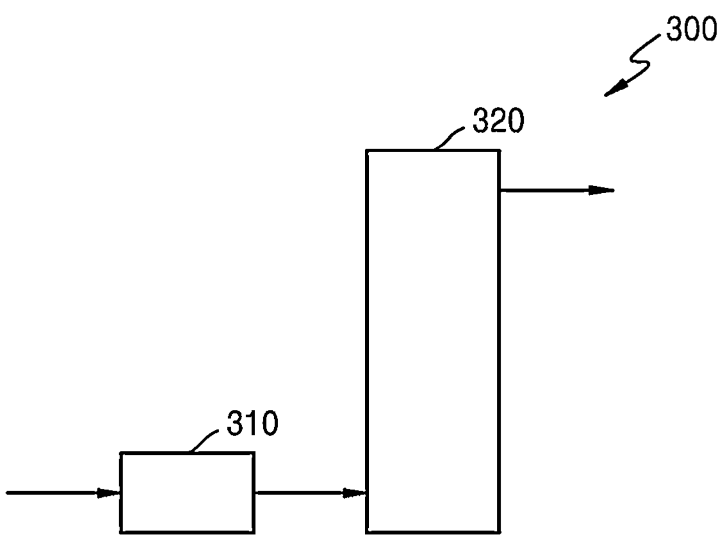
FIG. 2C is a block diagram of a fractional distillation module according to embodiments.
Figure 2D:
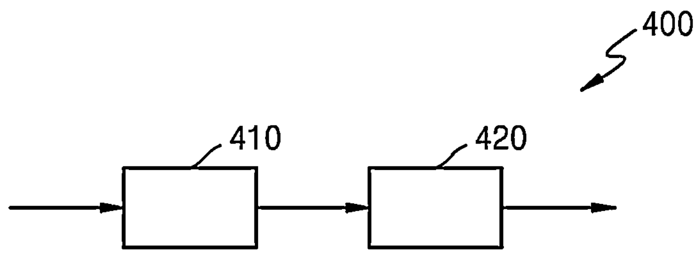
FIG. 2D is a block diagram of a back-end purification module according to embodiments.

FIG. 2A is a block diagram of a system 1000 for reusing helium from waste gas generated in a semiconductor process, according to embodiments. FIG. 2B is a block diagram of a scrubber module 200 according to embodiments. FIG. 2C is a block diagram of a fractional distillation module 300 according to embodiments. FIG. 2D is a block diagram of a back-end purification module 400 according to embodiments.

Referring to FIG. 2A, the system 1000 for reusing helium from waste gas generated in a semiconductor process may include a semiconductor process facility 100, the scrubber module 200, the fractional distillation module 300, and the back-end purification module 400. According to embodiments, the system 1000 for reusing helium may include a plurality of analyzers for analyzing the gas composition at each stage.

According to embodiments, the semiconductor process facility 100 may use helium gas and emit helium-containing waste gas. For example, the semiconductor process may include an etching process, a deposition process, an ion implantation process, etc., but is not limited thereto. For example, helium gas may be mixed with a reactive gas and used in processes such as deposition and etching, or may be used alone for cooling and leakage check purposes.

According to embodiments, a composition of helium-containing waste gas emitted from the semiconductor process facility 100 may be analyzed through a first analyzer 110. The first analyzer 110 may include a real-time online analyzer or offline analyzer, and based on the analyzed waste gas composition through the first analyzer 110, it may be determined whether to proceed with a subsequent process, or the order of progress of the subsequent process may be changed.

According to embodiments, a first treatment gas may be formed by processing helium-containing waste gas emitted from the semiconductor process facility 100 with the scrubber module 200, in operation S110. Referring to FIG. 2A, the scrubber module 200 may include a first scrubber device 210, a second scrubber device 220, a first filter 230, a second filter 240, and a compression module 250.

According to embodiments, the first scrubber device 210 may be a burn-type scrubber configured to burn at least a portion of impurities included in helium-containing waste gas, and the at least portion of the impurities may be burned to produce contaminant powder. For example, the impurities are fumes emitted from the semiconductor process facility 100 and may include hydrocarbon compounds, organic compounds, inorganic compounds, organic-inorganic complex compounds, metal particles, etc. In the present disclosure, impurities refer to all substances except helium. Harmful substances in waste gas emitted from the semiconductor process facility may be decomposed or removed by the first scrubber device 210 and the second scrubber device 220.

According to embodiments, the second scrubber device 220 may be configured to clean a resultant product formed through the first scrubber device 210. For example, pure water (DI water) may be used as a cleaning solution, and the contaminant powder formed through the first scrubber device 210 may be removed by being collected in the cleaning solution. In addition, water-soluble gas contained in the waste gas may also be removed during this process.

According to embodiments, the first filter 230 may be configured to filter out particles having a diameter of 3 nm or more in the waste gas. For example, the first filter 230 may remove particles that were not removed through the first scrubber device 210 and the second scrubber device 220, for example, fine metal particles. In FIG. 2A, the first filter 230 is arranged at the rear of the second scrubber device 220. However, the present disclosure is not limited thereto. For example, the first filter 230 may be arranged at the front of the first scrubber device 210 to remove impurity particles in the helium-containing waste gas flowing into the first scrubber device 210.

Thereafter, the helium-containing waste gas treated by the first scrubber device 210, the second scrubber device 220, and the first filter 230 may be treated by the second filter 240 to form a first treatment gas. According to embodiments, the second filter 240 may remove moisture ($H_2O$) and carbon dioxide ($CO_2$) in the waste gas. The second filter 240 may include silica and zeolite, but is not limited to the example described above. The second filter 240 according to embodiments may be arranged at the front of the compression module 250 to prevent a compression facility from malfunctioning or being damaged due to condensation derived from moisture ($H_2O$) and carbon dioxide ($CO_2$) during a compression process.

In some embodiments, a second analyzer 120 may be arranged at the rear of the first filter 230 to analyze the composition of the first treatment gas. Through the second analyzer 120, it may be identified whether a contamination level in the first treatment gas is an appropriate level or below. In some embodiments, the second analyzer 120 may be arranged at the rear of the second scrubber device 220 to analyze the composition of the waste gas treated through the second scrubber device 220.

According to embodiments, the formed first treatment gas may be stored in the compression module 250. The compression module 250 may include a first buffer tank 250*a* and a second buffer tank 250*b*. The first treatment gas emitted from the front end may be optionally stored in the first buffer tank 250*a* or the second buffer tank 250*b*. In some embodiments, the first treatment gas emitted through the second filter 240 may be stored in the first buffer tank 250*a*. After the capacity of the first buffer tank 250*a* is full, the first treatment gas may be stored in the second buffer tank 250*b* instead of the first buffer tank 250*a*. For example, the compression module 250 may include a branch pipe connecting the first treatment gas emitted at the front end to the first buffer tank 250*a* and the second buffer tank 250*b*. While the first treatment gas is stored in the first buffer tank 250*a*, a pipe on the side of the second buffer tank 250*b* may be closed, and when the capacity of the first buffer tank 250*a* is full, the scrubber module 200 may be continuously operated by opening the pipe on the side of the second buffer tank 250*b* and closing the pipe on the side of the first buffer tank 250*a*. While the second buffer tank 250*b* is being filled with the first treatment gas, the first treatment gas may be compressed in the first buffer tank 250*a* in the full state, and the first treatment gas in the compressed state may be transported to a purification facility, in operation S120. Thereafter, when the capacity of the second buffer tank 250*b* is full, the first buffer tank 250*a* in an empty state may store the first treatment gas, and in this case, the first treatment gas stored in the second buffer tank 250*b* may be transported to the purification facility, in operation S120.

According to embodiments, the method S100 of reusing helium from waste gas generated in a semiconductor process may include, after treating the waste gas emitted from the semiconductor process facility 100 with the scrubber module 200, compressing the formed first treatment gas and transporting the compressed first treatment gas to an external purification facility, in operation S120. It may be easy to manage the semiconductor process facility 100 that is sensitive to an external environment, and when the system 1000 for reusing helium includes a plurality of semiconductor process facilities 100, first treatment gas formed from the plurality of semiconductor process facilities 100 may be gathered together and treated efficiently.

According to embodiments, the system 1000 for reusing helium may include the fractional distillation module 300 and the back-end purification module 400 in a purification facility.

Referring to FIG. 2C, the fractional distillation module 300 may include an adsorption column 310 and a distillation tower 320. The adsorption column 310 may remove at least some of impurities in the transported first treatment gas. For example, impurities introduced through pipes, tank trucks, etc. used during transport may be removed through the adsorption column 310. The adsorption column 310 may remove moisture and carbon dioxide in the first treatment gas before the first treatment gas is treated by the distillation tower 320.

In some embodiments, the adsorption column 310 may include a pressure swing adsorption (PSA) type adsorbent that adsorbs impurities at high pressure and then desorbs the impurities at low pressure. Because the first treatment gas is transported to the purification facility in a compressed state, the high-pressure first treatment gas may be treated with a PSA type adsorbent, so that at least some of the impurities contained in the first treatment gas may be efficiently removed.

According to embodiments, helium gas with a first purity may be formed by fractionating the first treatment gas treated by the adsorption column 310 in the distillation tower 320, in operation S130. According to embodiments, the first treatment gas may first be liquefied to form a first treatment liquid. For example, the first treatment liquid may be formed by liquefying the first treatment liquid at low temperature and high pressure. Thereafter, a temperature of the first treatment liquid may be slowly raised, so that a portion of the first treatment liquid is vaporized, and helium gas with the first purity separated from the first treatment liquid may be collected. Helium gas has a very low boiling point of about −270° C. at atmospheric pressure, and because the boiling point difference between helium gas and other components is relatively large, helium may be easily separated from other impurities.

In some embodiments, considering that helium and other components have an azeotropic point, the distillation tower 320 may be designed in a plurality of stages, and the number of stages may be adjusted to collect helium gas with the first purity. For example, a portion of the first treatment liquid may be vaporized to form a second treatment gas, and after the second treatment gas is liquefied again to form a second treatment liquid, the second treatment liquid may be vaporized again so that a third treatment gas with a higher helium purity than the second treatment gas may be formed. In some embodiments, the second treatment gas or third treatment gas may be collected, and the remaining first treatment liquid and the remaining second treatment liquid may be recovered, mixed, and distilled again.

In some embodiments, a third analyzer 130 may be arranged at the rear of the fractional distillation module 300 to identify whether the helium gas obtained through fractional distillation has a first purity or higher.

In some embodiments, the first purity may be about 99.999%. In the present disclosure, helium gas with the first purity may be referred to as crude helium.

According to embodiments, helium gas with a concentration of a second purity or higher may be formed by treating the helium gas with the first purity through the back-end purification module 400.

According to embodiments, the back-end purification module 400 may remove at least some of the impurities contained in the helium with the first purity. Referring to FIG. 2D, the back-end purification module 400 may include a first purifier 410 and a second purifier 420. In some embodiments, each of the first purifier 410 and the second purifier 420 may include an adsorbent. For example, the adsorbent may include at least one selected from among activated alumina, silica gel, and molecular sieve. For example, the molecular sieve may include zeolite, porous glass, activated carbon, etc.

In some embodiments, the first purifier 410 and the second purifier 420 may be of different types from each other. For example, the first purifier 410 may include activated carbon, and the second purifier 420 may include zeolite. In some embodiments, the first purifier 410 and the second purifier 420 may include the same type of adsorbent, but the pore size of the adsorbent contained in the second purifier 420 may be smaller than the pore size of the adsorbent contained in the first purifier 410. In FIG. 2D, the back-end purification module 400 includes two purifiers 410 and 420. However, the present disclosure is not limited thereto. For example, one of the two purifiers may be omitted, or the back-end purification module 400 may include three or more different purifiers.

In some embodiments, a fourth analyzer 140 may be arranged at the rear of the back-end purification module 400 to identify whether the purity of the helium gas satisfies a reusable level, for example, the second purity or higher. In some embodiments, at the rear of the back-end purification module 400, the fourth analyzer 140 may be arranged in a purification facility and/or at the front of the semiconductor process facility 100 that reuses helium with the second purity.

In some embodiments, the second purity may be about 99.9999999%. In the present disclosure, helium gas with the second purity may be referred to as purified helium. For example, purified helium gas may be about 99.999999% to about 99.999999999% pure.

According to embodiments, helium gas with the second purity formed in the back-end purification module 400 may be compressed, and the compressed helium gas may be provided to the semiconductor process facility 100 in which compressed helium gas is necessary, in operation S150. Because the method of recycling helium, according to embodiments, targets helium-containing waste gas emitted from semiconductor process facilities, it is not only environmentally friendly because harmful substances in the waste gas emitted from the semiconductor process facilities may be treated, but also a relatively high content of helium is contained in the waste gas to be treated, so that helium may be supplied more efficiently.

Figure 3:
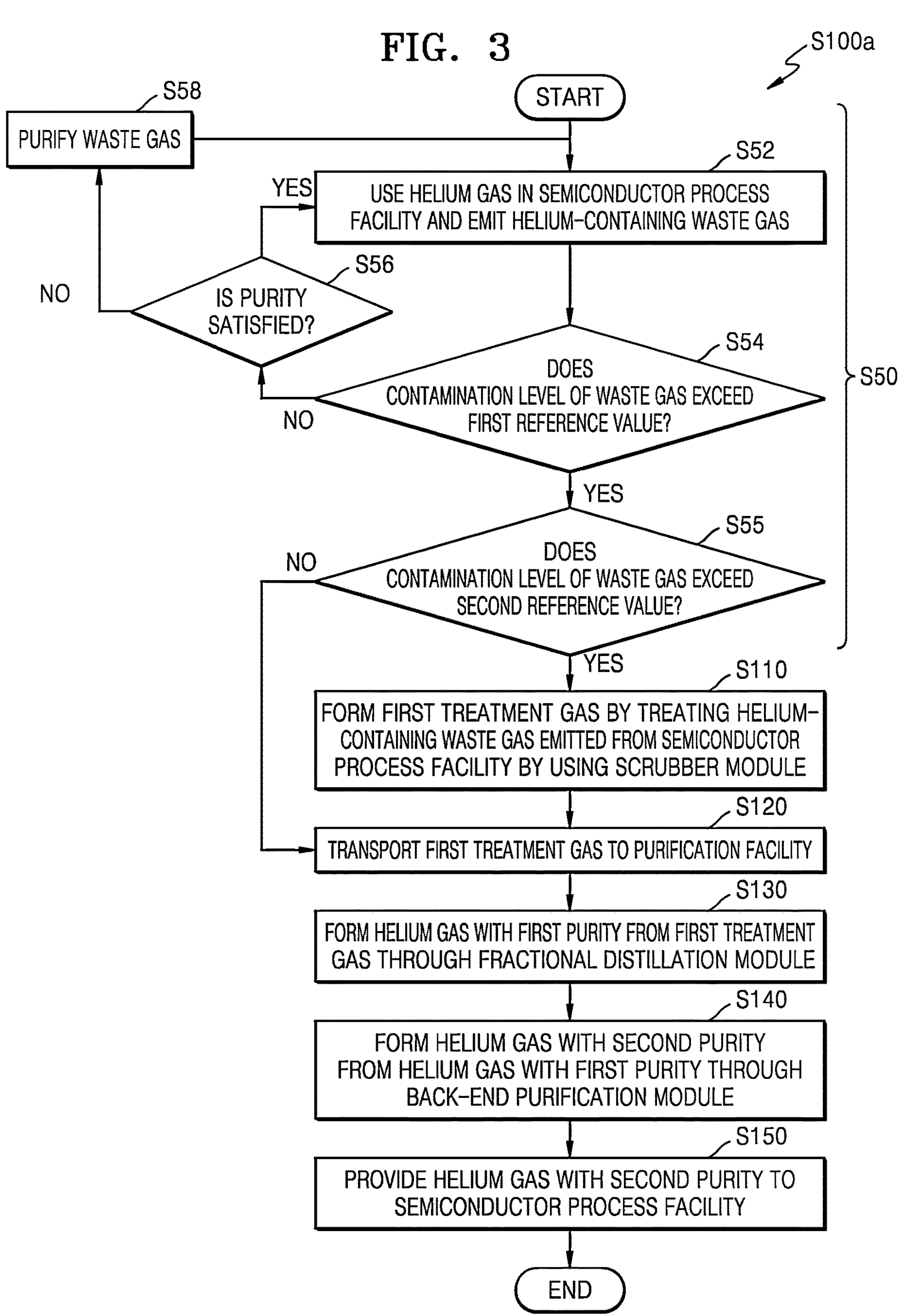
FIG. 3 is a flowchart of a method of reusing helium from waste gas generated in a semiconductor process, according to some embodiments.
Figure 4:
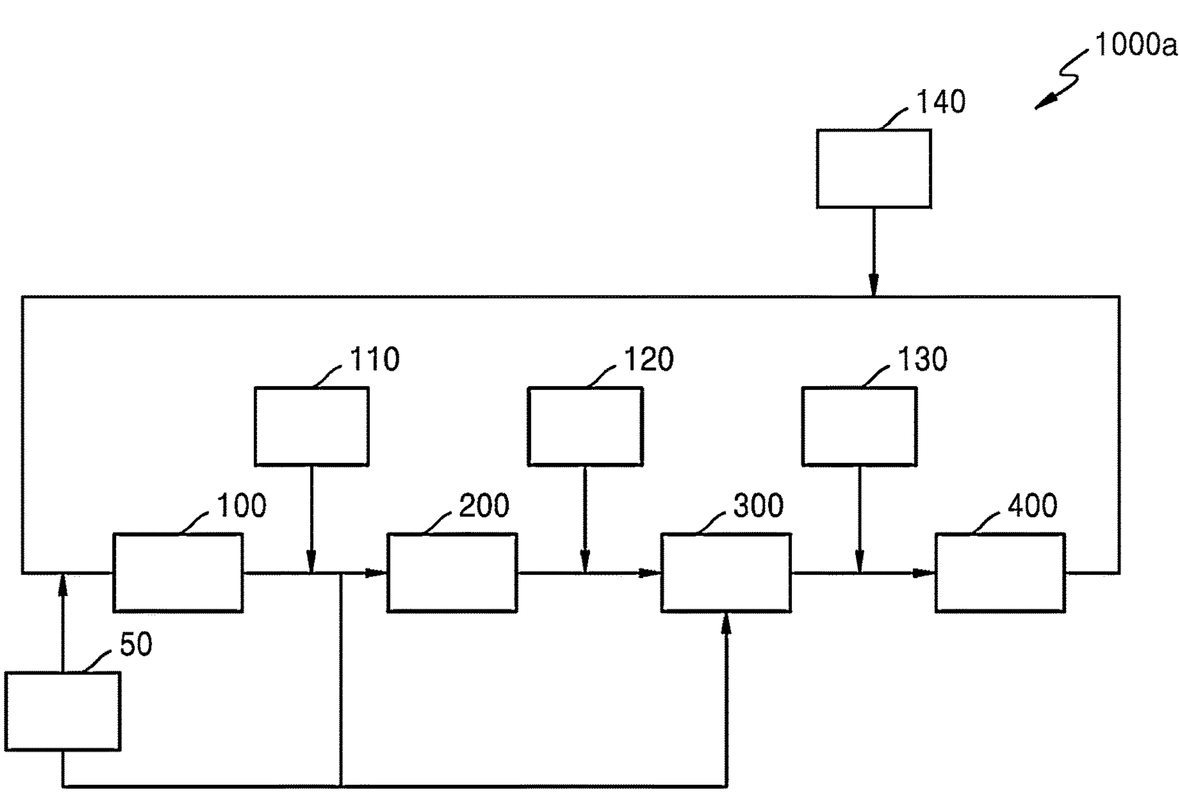
FIG. 4 is a block diagram of a system for reusing helium from waste gas generated in a semiconductor process, according to some embodiments.

FIG. 3 is a flowchart of a method S150 of reusing helium from waste gas generated in a semiconductor process, according to some embodiments. FIG. 4 is a block diagram of a system 1000*a* for reusing helium from waste gas generated in a semiconductor process, according to some embodiments. In FIGS. 3 and 4, the same reference characters as those of FIGS. 1, 2A, and 2B denote the same member or operation, and redundant descriptions thereof are omitted herein.

Referring to FIGS. 3 and 4, the method S100*a* of reusing helium has substantially the same treatment operations as the method S100 of reusing helium described with reference to FIGS. 1, 2A, and 2B. However, the method S100*a* of reusing helium includes a preliminary treatment operation S50 in which the composition of the helium-containing waste gas is analyzed before treating the helium-containing waste gas with the scrubber module 200, and in some cases, the waste gas is circulated.

According to embodiments, the preliminary treatment operation S50 may include an operation S52 of using purified helium in the semiconductor process facility 100 and emitting helium-containing waste gas, operations S54 and S55 of determining whether a contamination level exceeds a reference value by analyzing the composition of the waste gas, an operation S56 of determining the purity of helium in the waste gas when the contamination level of the waste gas is the reference value or below, and an operation S58 of, when the purity of helium in the waste gas is less than the purity of purified helium, purifying the waste gas by using a front-end purification module and circulating the purified gas to the semiconductor process facility 100.

According to embodiments, the semiconductor process facility 100 may use purified helium and emit helium-containing waste gas, in operation S52. According to embodiments, it may be determined whether a contamination level of the emitted waste gas exceeds a first reference value by analyzing the composition of the waste gas through the first analyzer 110, in operation S54. The contamination level of the waste gas may be set based on whether the waste gas contains, for example, hazardous substances, metal particles, inert organic compounds, etc.

According to embodiments, when the contamination level of the waste gas is the first reference value or below, it may be determined whether the concentration of helium contained in the waste gas satisfies a second purity, in operation S56. In some embodiments, when the concentration of helium in the waste gas is about 99.99999999% or more, the waste gas may be collected and reused for the semiconductor process facility 100. For example, purified helium gas used to identify whether a facility is sealed in a semiconductor process conducted in a vacuum may have a second purity even after use, and in this case, the emitted waste gas may be collected and reused without separate treatment.

In some embodiments, when the contamination level of the waste gas is the first reference value or below or does not satisfy the second purity, the waste gas may be purified by using a front-end purification module 50 to form purified helium gas with the second purity, in operation S58. For example, the front-end purification module 50 may have substantially the same configuration as the back-end purification module 400 described with reference to FIG. 2D, and descriptions thereof are omitted. The helium gas with the second purity formed from the front-end purification module 50 may be recycled in the semiconductor process facility 100.

In some embodiments, as a result of determining whether the contamination level of the waste gas exceeds the first reference value, in operation S54, when the waste gas has a contamination level exceeding the first reference value, it may be determined whether the contamination level of the waste gas exceeds a second reference value, in operation S55. For example, waste gas having a contamination level exceeding the second reference value may include organosilicon compounds, metal particles, fluorine oxides, etc., but is not limited to the examples described above. In some embodiments, when the contamination level of the waste gas exceeds the first reference value but is less than the second reference value, the operation S110 of treating the waste gas with the scrubber module 200 is omitted and the waste gas may be compressed and transported to a purification facility, in operation S120. In some embodiments, when the contamination level of the waste gas exceeds the second reference value, helium-containing waste gas may be treated with the scrubber module 200 to form a first treatment gas, in operation S110. The formed first treatment gas may be compressed and transported to a purification facility, in operation S120. Processes after the treatment of helium-containing waste gas with the scrubber module 200 and the transport to the purification facility may proceed identically as described with reference to FIGS. 1 and 2A to 2D.

Figure 5:
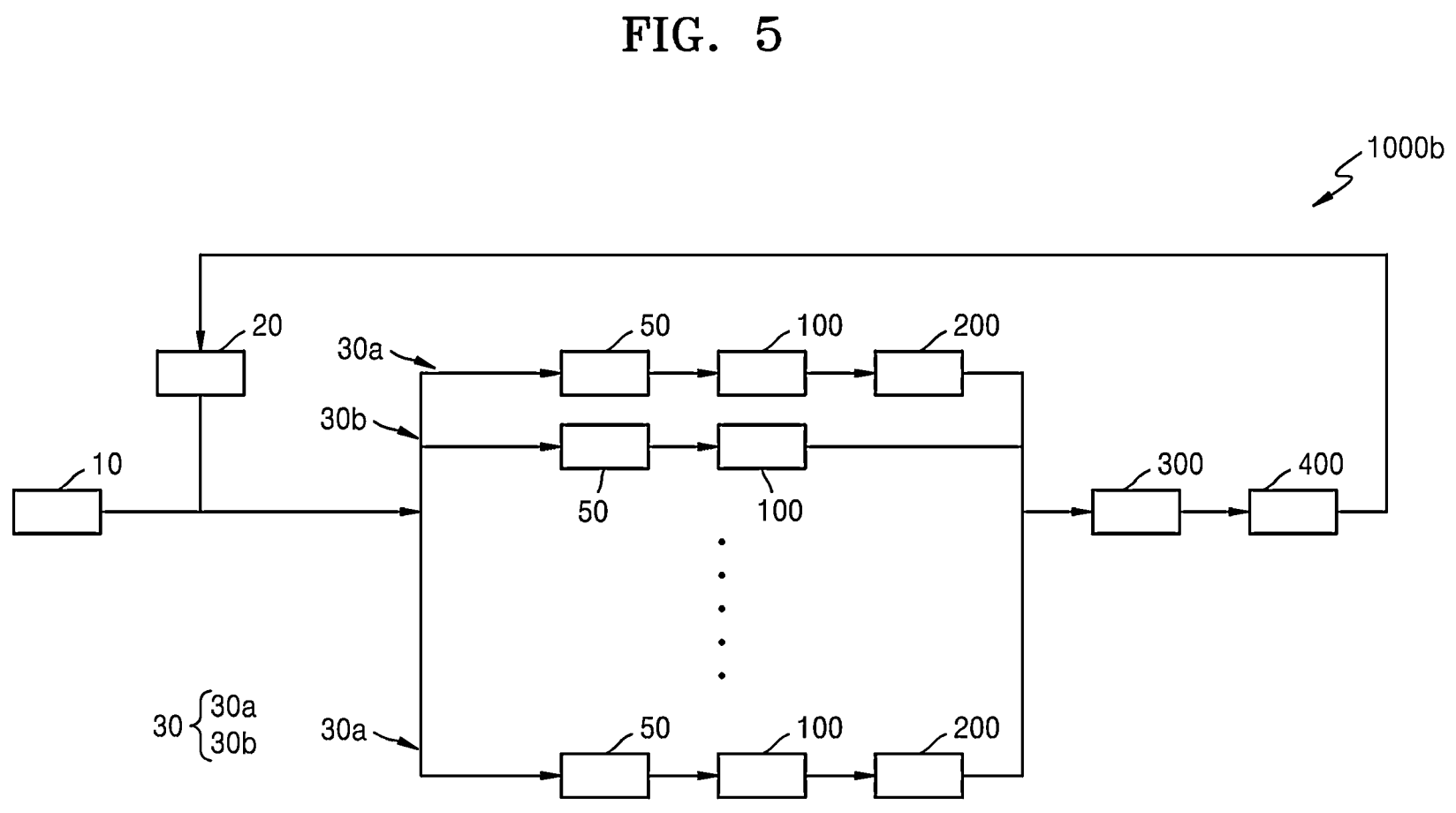

FIG. 5 is a block diagram of a system 1000*b* for reusing helium from waste gas generated in a semiconductor process, according to some embodiments. In FIG. 5, the same reference characters as those of FIGS. 1, 2A, 2B, 3, and 4 denote the same member or operation, and redundant descriptions thereof are omitted herein.

Referring to FIG. 5, the system 1000*b* for reusing helium from waste gas generated in a semiconductor process may include a supply tank 10, a backup tank 20, a plurality of semiconductor process lines 30, a fractional distillation module 300, and a back-end purification module 400.

According to embodiments, the supply tank 10 and the backup tank 20 store purified helium and may be located away from the plurality of semiconductor process lines 30 that is sensitive. The plurality of semiconductor process lines 30 may receive purified helium from the supply tank 10 and/or the backup tank 20.

The supply tank 10 may store purified helium imported from the outside. For example, the supply tank 10 may store liquefied purified helium transported through logistics. Although not shown, the system 1000*b* for reusing helium may further include a vaporizer (not shown), and the liquefied purified helium may be vaporized through the vaporizer (not shown) and supplied to the plurality of semiconductor process lines 30.

The backup tank 20 may store helium gas with a second purity, which is obtained by purifying waste gas emitted from the plurality of semiconductor process lines 30. For example, the backup tank 20 may be used as a spare or supplement when purified helium cannot be supplied from another country or company through logistics or when the quantity is insufficient. However, the present disclosure is not limited thereto, and the backup tank 20 may be used as a main helium supply tank, and the imported purified helium of the supply tank 10 may be used as a spare or supplement.

According to embodiments, the purified helium may be supplied to each of the plurality of semiconductor process lines 30. In some embodiments, each of the plurality of semiconductor process lines 30 may include a front-end purification module 50. The front-end purification module 50 may be configured to remove external atmospheric impurities introduced during the transport of purified helium. A configuration of the front-end purification module 50 is substantially the same as the back-end purification module 400 described with reference to FIGS. 1, 2A, and 2D. In some embodiments, the front-end purification module 50 may further include a fine filter (not shown). The fine filter (not shown) may be configured to filter out particles having a diameter of 3 nm or more. For example, the fine filter (not shown) may remove external particles introduced from transportation pipes or tank trucks. In addition, an analyzer (not shown) may additionally arranged at the front end of the plurality of semiconductor process facilities 100, so that it may be identified whether the purified helium that has passed through the front-end purification module 50 and the fine filter (not shown) has a second purity.

According to embodiments, each of the plurality of semiconductor process lines 30 may use purified helium to form and emit helium-containing waste gas. According to the embodiments, treatment of waste gas may be different for each of the plurality of semiconductor process lines 30. In some embodiments, the plurality of semiconductor process lines 30 may include a first process line 30*a* including a scrubber module 200 and a second process line 30*b* not including the scrubber module 200.

In some embodiments, the semiconductor process facility 100 of the first process line 30*a* may emit waste gas with a high contamination level. For example, the semiconductor process facility 100 of the first process line 30*a* may emit waste gas including various fumes or particles generated during processes such as an etching process and a deposition process.

In some embodiments, the semiconductor process facility 100 of the second process line 30*b* may emit waste gas that does not require treatment by the scrubber module 200 due to a relatively low contamination level thereof. For example, the semiconductor process facility 100 of the second process line 30*b* may use purified helium in the wafer cooling or leakage check step and emit waste gas containing some external atmospheric elements such as oxygen, hydrogen, or nitrogen.

As illustrated in FIG. 5, in the first process line 30*a*, the waste gas may be treated with the scrubber module 200 and then transported to the purification facility, and in the second process line 30*b*, a treatment by the scrubber module 200 may be omitted and the waste gas may be directly transported to the purification facility. In some embodiments, the first treatment gas emitted from the first process line 30*a* and the waste gas emitted from the second process line 30*b* may each be compressed and transported to the purification facility.

In FIG. 5, the plurality of semiconductor process lines 30 are separate and different lines. However, the present disclosure is not limited thereto. For example, in a single semiconductor process line 30, treatments with a high level of waste gas contamination level and treatments with a low level of waste gas contamination level may be performed in different orders depending on the treatment order, and in this case, the treatment of emitted waste gases may vary depending on the type of treatment.

In some embodiments, the first treatment gas and waste gas transported to the purification facility may be mixed and treated in the fractional distillation module 300 and the back-end purification module 400. Specific configurations and gas treatment methods of the fractional distillation module 300 and the back-end purification module 400 are the same as those described with reference to FIGS. 1 and 2A to 2D.

According to embodiments, purified helium formed in the back-end purification module 400 may be compressed and provided to the backup tank 20. Helium stored in the backup tank 20 may be supplied again to the plurality of semiconductor process lines 30.

Although not shown in FIG. 5, a system for reusing helium may include an analyzer at the front and/or rear of each treatment module or device. For example, the composition of a treatment gas may be analyzed in each treatment operation, so that it may be identified whether a desired contamination level and purity of helium are satisfied.

In a method of reusing helium from waste gas in a semiconductor process, according to embodiments, treatment of waste gas emitted from a plurality of semiconductor process lines may vary. Thus, the waste gas may be treated more efficiently by treating the helium-containing waste gas differently for each type. In the method of reusing helium, according to embodiments, helium may be purified and recycled from waste gas having a relatively high content of helium, so that it may be energy efficient compared to a case of purifying helium from natural gas or external air and using the helium outside, and helium supply and demand instability due to external factors may be improved.

While the present disclosure has been particularly shown and described with reference to embodiments thereof, it will be understood that various changes in form and details may be made therein without departing from the spirit and scope of the following claims.

What is claimed is:

1. A method of recycling helium from a waste gas generated in a semiconductor process, the method comprising:

forming a first treatment gas by treating helium-containing waste gas emitted from a semiconductor process facility by using a scrubber module;

transporting the first treatment gas to a purification facility;

forming a first helium gas with a first purity by fractionating the first treatment gas in the purification facility;

forming a second helium gas with a second purity by treating the first helium gas by using a back-end purification module in the purification facility; and providing the second helium gas to the semiconductor process facility.

2. The method of claim 1, wherein the scrubber module comprises a first scrubber device and a second scrubber device, and wherein the treating of the helium-containing waste gas by using the scrubber module comprises:

forming a contaminant powder by burning at least some of impurities in the helium-containing waste gas in the first scrubber device; and forming the first treatment gas by removing the contaminant powder with a cleaning solution in the second scrubber device.

3. The method of claim 2, wherein the treating of the waste gas by using the scrubber module further comprises:

removing moisture and carbon dioxide from the first treatment gas; and compressing the first treatment gas.

4. The method of claim 1, further comprising, before the fractionating of the first treatment gas, removing moisture and carbon dioxide from the first treatment gas in the purification facility.

5. The method of claim 1, further comprising, before the fractionating of the first treatment gas, subjecting the first treatment gas transported under high pressure to pressure swing adsorption, and removing at least some of impurities from the first treatment gas.

6. The method of claim 1, wherein the forming of the first helium gas with the first purity by fractionating the first treatment gas in the purification facility comprises:

forming a first treatment liquid by liquefying the first treatment gas; and forming a second treatment liquid and the first helium gas from the first treatment liquid by increasing a temperature of the first treatment liquid.

7. The method of claim 1, wherein the forming of the first treatment gas comprises filtering out particles having a diameter of 3 nm or more from the waste gas through a filter.

8. The method of claim 1, further comprising, before the treating of the waste gas by using the scrubber module, determining a contamination level by analyzing a composition of the waste gas, wherein, where the contamination level of the waste gas is a first reference value or below and a concentration of the waste gas is less than the second purity, the method further comprises, after the second helium gas is formed from the waste gas through a front-end purification module, recycling the second helium gas in the semiconductor process.

9. The method of claim 8, wherein, where the contamination level of the waste gas is the first reference value or below and the concentration of the waste gas is the second purity or more, the method further comprises recycling the waste gas in the semiconductor process.

10. The method of claim 8, wherein, where the contamination level of the waste gas exceeds the first reference value but is not more than a second reference value higher than the first reference value, the method further comprises compressing and transporting the waste gas to the purification facility without treating the waste gas by using the scrubber module, and wherein, where the contamination level of the waste gas exceeds the second reference value, the method further comprises treating the waste gas by using the scrubber module.

11. A method of recycling helium from a waste gas generated in a semiconductor process, the method comprising:

using helium gas transported from a semiconductor raw material storage facility in a first process line and a second process line;

forming a first helium-containing waste gas in the first process line and forming a second helium-containing waste gas in the second process line;

forming a first treatment gas by processing the first helium-containing waste gas by using a scrubber module, and compressing the first treatment gas and the second helium-containing waste gas and transporting the first treatment gas and the second helium-containing waste gas to a purification facility;

forming a second treatment gas by mixing the first treatment gas and the second helium-containing waste gas in the purification facility, and forming a first helium gas with a first purity by fractionating the second treatment gas;

forming a second helium gas with a second purity by treating the first helium gas by using a back-end purification module in the purification facility; and compressing the second helium gas and providing the compressed second helium gas to the semiconductor raw material storage facility.

12. The method of claim 11, wherein the scrubber module comprises a first scrubber device and a second scrubber device, and wherein the treating of the first helium-containing waste gas by using the scrubber module comprises:

forming a contaminant powder by burning at least some of impurities in the first helium-containing waste gas in the first scrubber device; and forming the first treatment gas by removing the contaminant powder with a cleaning solution in the second scrubber device.

13. The method of claim 12, wherein the scrubber module comprises a first buffer tank and a second buffer tank that are optionally connected to the second scrubber device to store the first treatment gas, and wherein the method further comprises:

storing the first treatment gas emitted from the second scrubber device in the first buffer tank by connecting the second scrubber device to the first buffer tank;

after filling in a capacity of the first buffer tank, storing the first treatment gas in the second buffer tank by disconnecting the second scrubber device and the first buffer tank from each other and connecting the second scrubber device to the second buffer tank; and while the first treatment gas is stored in the second buffer tank, compressing the first treatment gas stored in the first buffer tank and transporting the compressed first treatment gas to the purification facility.

14. The method of claim 11, further comprising, before the helium gas is used in each of the first process line and the second process line, transporting the helium gas from the semiconductor raw material storage facility and purifying the helium gas through a front-end purification module.

15. The method of claim 14, further comprising filtering out, in the front-end purification module, impurity particles having a diameter of 3 nm or more contained in the helium gas through a front-end filter.

16. The method of claim 11, further comprising removing, in the back-end purification module, at least some of impurities contained in the first helium gas by using an adsorbent, wherein the adsorbent comprises at least one selected from the group consisting of activated alumina, silica gel, and molecular sieve.

17. A method of recycling helium from a waste gas generated in a semiconductor process, the method comprising:

forming a contaminant powder by burning a helium-containing waste gas emitted from a semiconductor process facility by using a scrubber module, and forming a first treatment gas by removing the contaminant powder by using a cleaning solution;

filtering out impurity particles having a diameter of 3 nm or more contained in the first treatment gas;

compressing the first treatment gas and transporting the compressed first treatment gas to a purification facility;

removing at least some of impurities from the first treatment gas by performing pressure swing adsorption on the first treatment gas transported under high pressure in the purification facility;

after a first treatment liquid is formed by liquefying the first treatment gas in the purification facility, obtaining a first helium gas with a first purity separated into vapor by increasing a temperature of the first treatment liquid by using a difference in boiling point;

forming a second helium gas with a second purity by treating the first helium gas by using a back-end purification module in the purification facility; and compressing the second helium gas and providing the compressed second helium gas to the semiconductor process facility.

18. The method of claim 17, further comprising, before the treating of the waste gas by using the scrubber module, determining a contamination level by analyzing a composition of the waste gas, wherein, where the contamination level of the waste gas is a first reference value or below and a concentration of the waste gas is less than the second purity, the method further comprises, after the second helium gas is formed from the waste gas through a front-end purification module, recycling the second helium gas in the semiconductor process.

19. The method of claim 18, wherein, where the contamination level of the waste gas is the first reference value or below and the concentration of the waste gas is the second purity or more, the method further comprises recycling the waste gas in the semiconductor process.

20. The method of claim 18, wherein, where the contamination level of the waste gas exceeds the first reference value but is not more than a second reference value higher than the first reference value, the method further comprises compressing and transporting the waste gas to the purification facility without treating the waste gas using the scrubber module, and wherein, where the contamination level of the waste gas exceeds the second reference value, the method further comprises treating the waste gas by using the scrubber module.

* * * * *